United States Patent
Kazmaier et al.

(10) Patent No.: US 9,089,920 B2
(45) Date of Patent: Jul. 28, 2015

(54) METHOD FOR CHANGING A WELDING PROCESS DURING A WELDING OPERATION AND METHOD FOR APPLYING HEAT PRIOR TO A WELDING OPERATION

(75) Inventors: Joerg Kazmaier, Thalheim bei Wels (AT); Josef Artelsmair, Wartberg/Krems (AT); Willi Baumann, Hofkirchen (AT); Walter Stieglbauer, Manning (AT)

(73) Assignee: Fronius International GmbH, Pettenbach (AT)

( * ) Notice: Subject to any disclaimer, the term of this patent is extended or adjusted under 35 U.S.C. 154(b) by 690 days.

(21) Appl. No.: 13/322,615

(22) PCT Filed: Jun. 14, 2010

(86) PCT No.: PCT/AT2010/000213
§ 371 (c)(1),
(2), (4) Date: Nov. 28, 2011

(87) PCT Pub. No.: WO2010/144931
PCT Pub. Date: Dec. 23, 2010

(65) Prior Publication Data
US 2012/0074115 A1    Mar. 29, 2012

(30) Foreign Application Priority Data
Jun. 18, 2009    (AT) .................................. A 946/2009

(51) Int. Cl.
B23K 9/10    (2006.01)
B23K 9/09    (2006.01)
B23K 9/095    (2006.01)

(52) U.S. Cl.
CPC . *B23K 9/09* (2013.01); *B23K 9/095* (2013.01); *B23K 9/0953* (2013.01)

(58) Field of Classification Search
CPC .......................................... B23K 9/06–9/0956
USPC ........................................ 219/130.01–130.51
See application file for complete search history.

(56) References Cited

U.S. PATENT DOCUMENTS 4,485,293 A    11/1984    Tabata et al.
4,580,026 A *    4/1986    Stol .............................. 219/136

(Continued)

FOREIGN PATENT DOCUMENTS

DE    10 2006 05 0297    4/2008
EP    1 726 395    11/2006

(Continued)

OTHER PUBLICATIONS

International Search Report of PCT/AT2010/000213, date of mailing Sep. 21, 2010.

(Continued)

*Primary Examiner* — Sang Y Paik
(74) *Attorney, Agent, or Firm* — Collard & Roe, P.C.

(57) ABSTRACT

The invention relates to a method for changing a welding process during a welding operation, wherein the change is carried out from a welding process that was conducted to a subsequent welding process during a short circuit between a melting welding wire and a workpiece, and to a method for applying heat prior to a welding operation. In order to achieve a welding process with high process stability, it is provided that, upon detecting the short circuit of the welding process that is conducted, the welding wire (9) is still moved for a defined duration (32) in the movement direction and subsequently stopped, depending on a threshold value (34) of the welding current (I) of the subsequent welding process, whereupon upon reaching the threshold value (34) of the welding current (I), the welding wire (9) is moved in the opposite direction in order to start the subsequent welding process.

15 Claims, 5 Drawing Sheets

(56) References Cited

U.S. PATENT DOCUMENTS

| | | | |
|---|---|---|---|
| 5,473,139 A * | 12/1995 | Matsui et al. | 219/130.51 |
| 6,717,107 B1 * | 4/2004 | Hsu | 219/130.51 |
| 2006/0102695 A1 * | 5/2006 | Era et al. | 228/101 |
| 2006/0138115 A1 * | 6/2006 | Norrish et al. | 219/137.71 |
| 2008/0149606 A1 * | 6/2008 | Uezono | 219/124.01 |
| 2008/0156781 A1 * | 7/2008 | Artelsmair et al. | 219/130.5 |
| 2008/0314884 A1 | 12/2008 | Fujiwara et al. | |

FOREIGN PATENT DOCUMENTS

| | | |
|---|---|---|
| EP | 1 985 400 | 10/2008 |
| JP | S57-168775 A | 10/1982 |
| JP | 57 187175 | 11/1982 |
| JP | 11 090628 | 4/1999 |
| JP | 2005 313179 | 11/2005 |
| WO | WO 2006/089322 | 8/2006 |

OTHER PUBLICATIONS

Austrian Patent Office Preliminary Office Action dated Apr. 8, 2010 in Austrian Application No. A 946/2009.

Japanese Office Action of Japanese Patent Application No. 2012-515284 dispatched Jul. 2, 2013, with English translation of same.

* cited by examiner

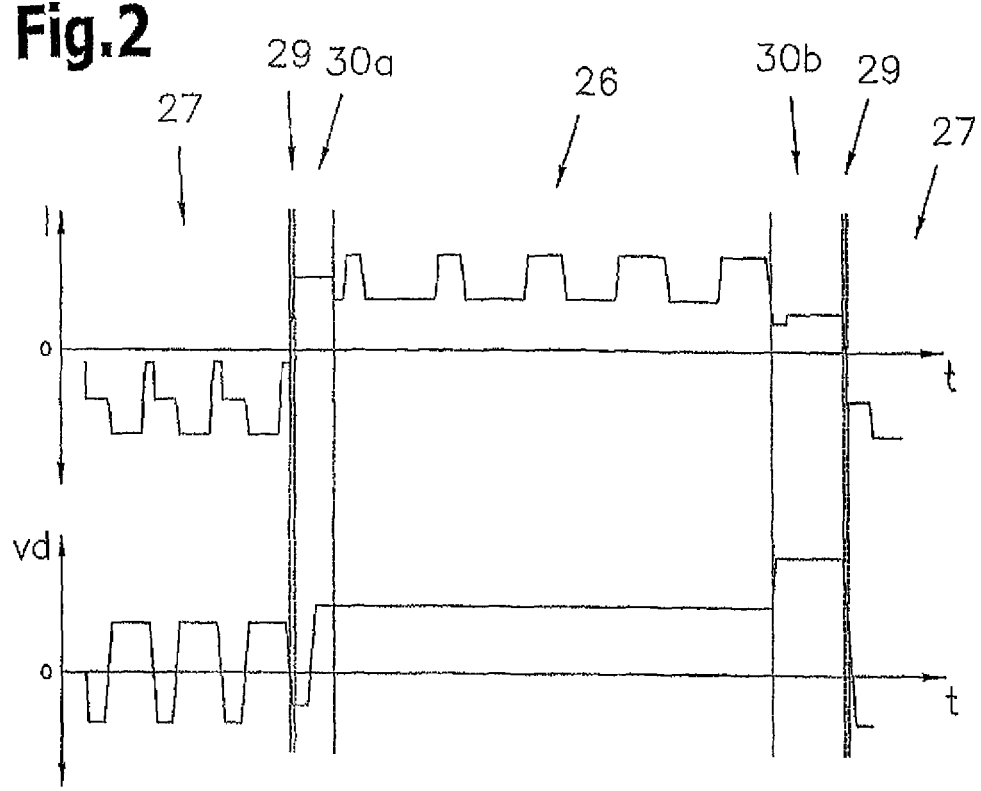
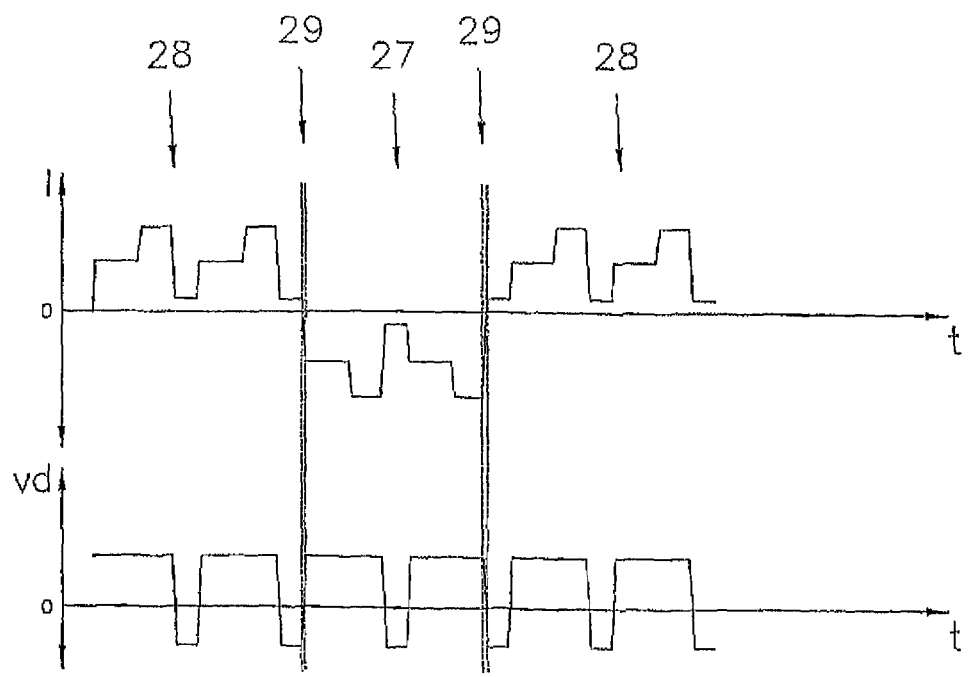

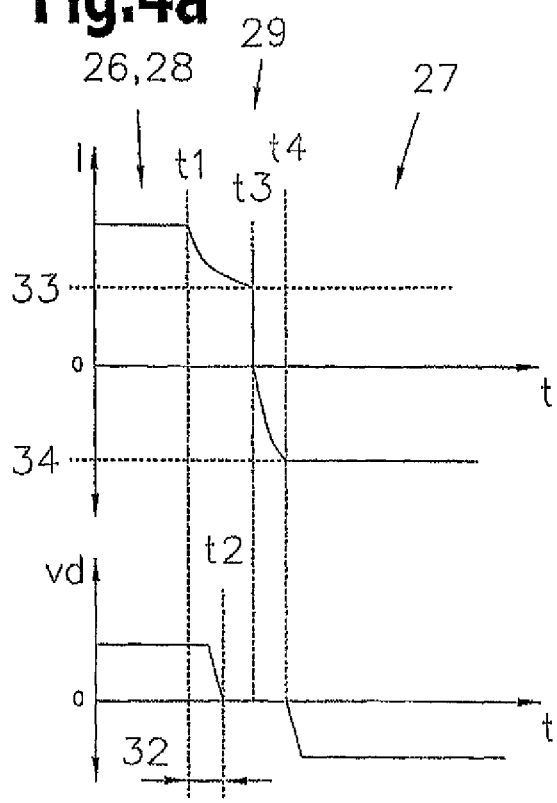
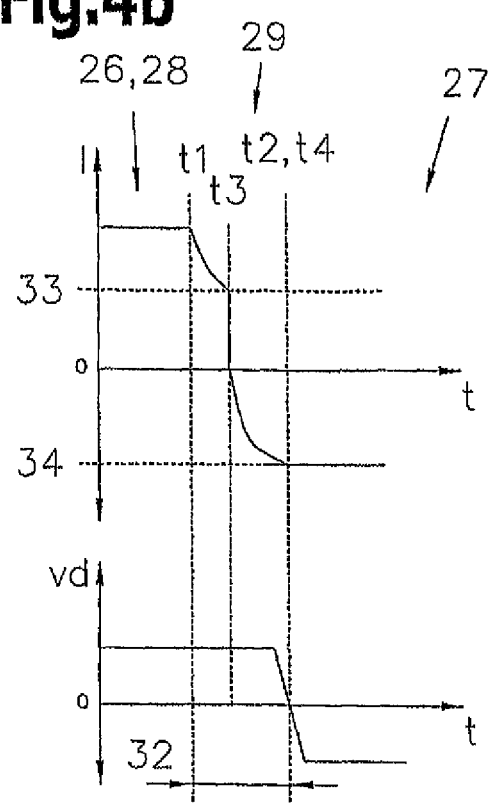
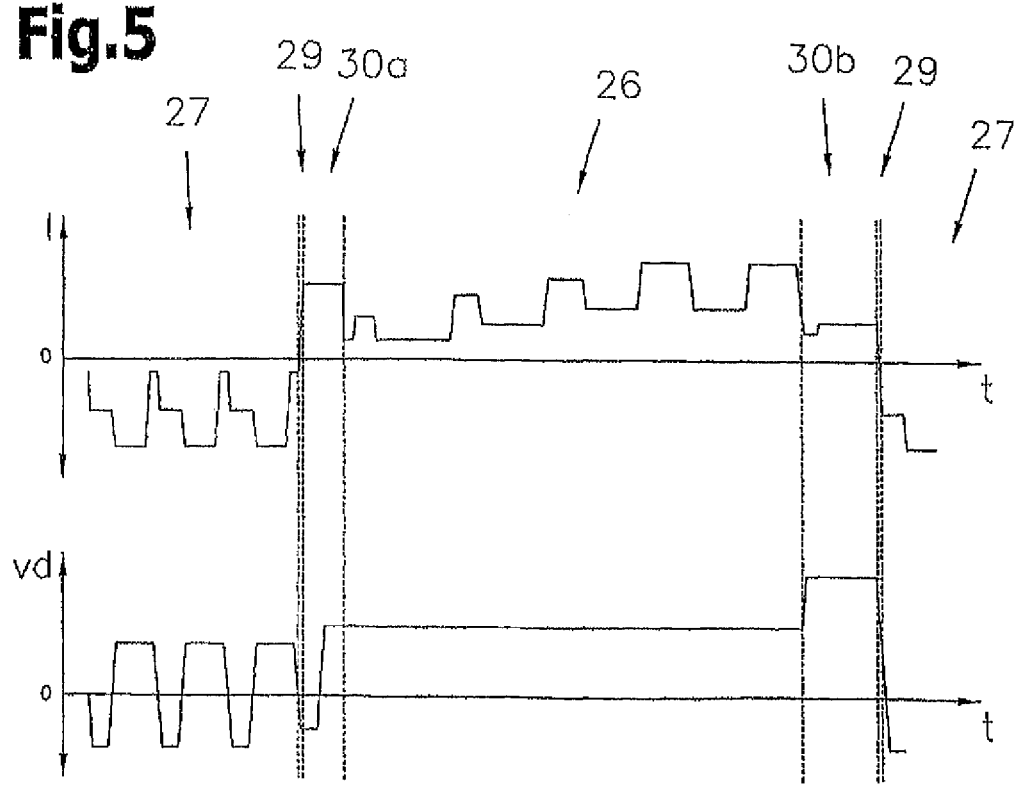

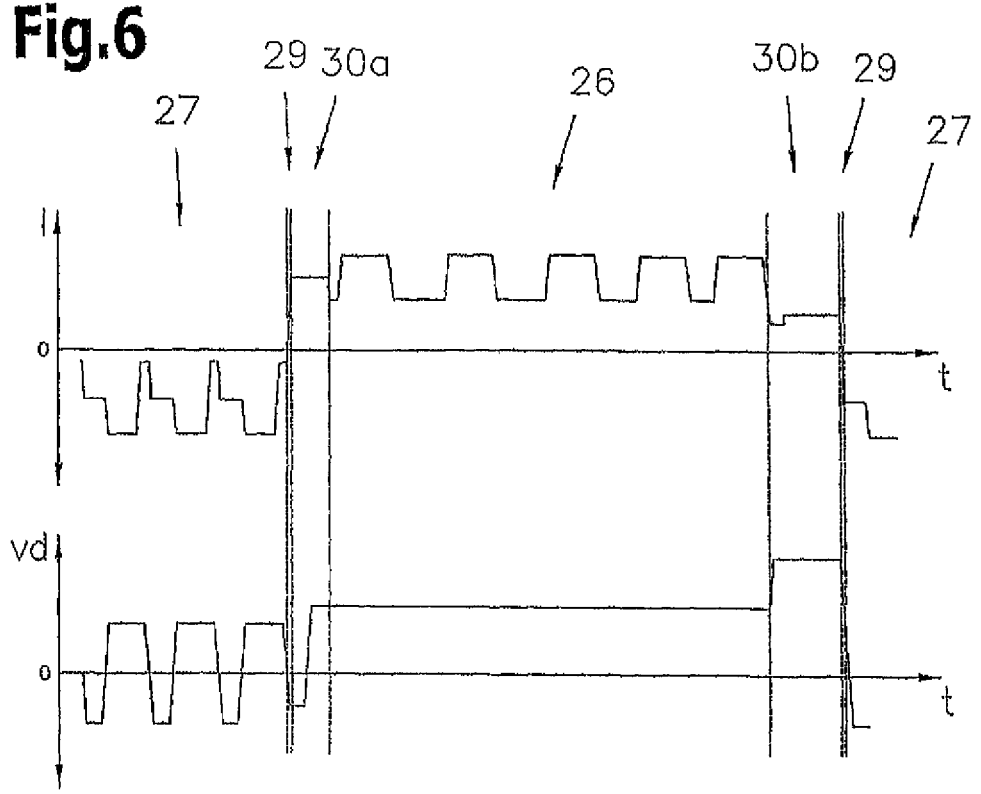
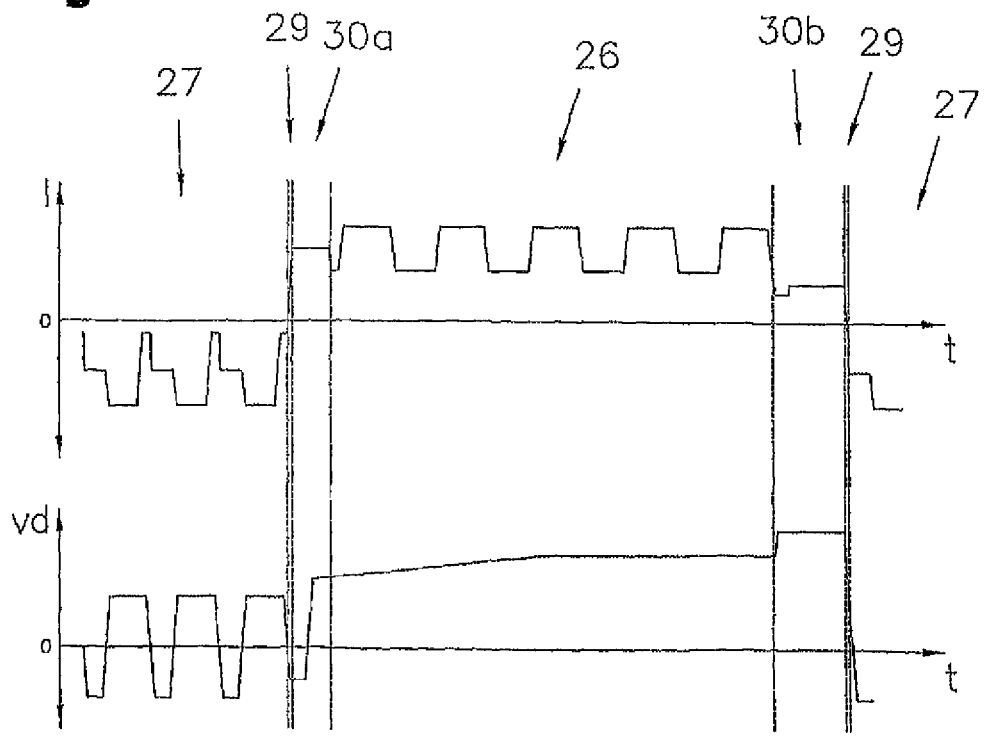

METHOD FOR CHANGING A WELDING PROCESS DURING A WELDING OPERATION AND METHOD FOR APPLYING HEAT PRIOR TO A WELDING OPERATION

CROSS REFERENCE TO RELATED APPLICATIONS

This application is the National Stage of PCT/AT2010/000213 filed on Jun. 14, 2010, which claims priority under 35 U.S.C. §119 of Austrian Application No. A 946/2009 filed on Jun. 18, 2009. The international application under PCT article 21(2) was not published in English.

The invention relates to a method for changing a welding process during a welding operation, wherein the change is carried out from a welding process that was conducted to a subsequent welding process during a short circuit between a melting welding wire and a workpiece.

Moreover, the invention relates to a method for applying heat prior to a welding operation as well.

WO 2006/089322 describes a method for controlling and/or regulating a welding device and/or a welding current source carrying out a cold metal transfer (CMT) welding process after igniting an arc, with the welding wire being moved towards the workpiece until it contacts the workpiece, then reversing the movement direction during a short circuit phase after triggering a short circuit and moving the welding wire away from the workpiece until the short circuit is broken. For controlling the heat applied into the workpiece and/or the introduction of additional material, the polarity of the welding current and/or welding voltage will be changed during at least some short circuit phases, with the amplitude of the welding current and/or welding voltage being set to a defined value in order to prevent the welding wire and/or a short circuit bridge from melting while ensuring a reliable re-ignition of the arc upon removing the welding wire from the workpiece. Hence, changes are made between a "negative CMT process" and a "positive CMT process".

A drawback associated therewith is that no interference is observed during the polarity reversing procedure. As a consequence, the reversing of the polarity can be done with high power since the duration of the current change because of the inductance resulting from the length of the welding current circuit is not observed. This will lead to instability in the short circuit in particular. Furthermore, fluctuations in the weld pool may lead to the short circuit being broken during the change of the processes, causing an uncontrolled heat application as well as welding spatter. The direction of the reversing of the polarity during the change is not observed, either. These interferences are the main factors for diminishing process stability.

In general, a so-called "hot start", which comprises a "heat application" into the workpiece prior to a welding process, is known from the prior art as well. A drawback here is that this "hot start" is performed using a spray arc. As a consequence, the heat applied will be too high, especially in cases where a gap between two thin metal sheets has to be bridged, causing the material to melt. This is because a spray arc requires high power so that substantially only the duration of the hot start can be regulated. According to this, a high amount of energy and/or heat is applied into the workpiece over a short period of time, with the heat application not being adapted for the material.

The object of the present invention is to create methods like the ones specified above for a welding process with a high process stability, enabling a low and flexibly adjustable heat application as well as providing a high deposition rate and little distortion at the same time. The drawbacks of known methods should be reduced or eliminated.

The object of the invention is achieved by an above method for changing a welding process during a welding operation, wherein upon detecting the short circuit of the welding process that is conducted, the welding wire is still moved for a defined duration in the movement direction and subsequently stopped, depending on a threshold value of the welding current of the subsequent welding process, whereupon the welding wire is moved in the opposite direction in order to start the subsequent welding process upon reaching the threshold value of the welding current. An advantage here is that, during the duration of the change of the welding process, the short circuit is not broken due to fluctuations within the weld pool and the droplet size, since the welding wire is moved further into the weld pool upon detecting the short circuit. Another advantage is that the change does not depend on the length of the welding current circuit, since the duration of the current change because of the inductance is observed, so that the high process stability is not interrupted by the change. The term welding current circuit is used to denote the electric circuit formed by the power source, lines and the workpiece. Another advantage is that a reliable change of the welding process in the short circuit is ensured, as the change to the subsequent welding process and/or the breaking of the short circuit is not initiated as long as the current change has not been completed. In this way, the short circuit will be maintained at least during the duration of the current change. Furthermore, it is advantageous that larger gaps, in particular when working with thin metal sheets, can be bridged with higher process stability than is known from the prior art. This is because a higher deposition rate is achieved with an equally low heat application and/or an even lower heat application is achieved with an equal deposition rate when compared to the known CMT processes, so a gap with a continuously increasing and/or decreasing width, for example, can be bridged by a welding operation. Furthermore, the different welding processes lead to a flexible setting of the heat application and/or the deposition rate.

The change of the welding process is advantageously carried out by reaching a threshold value of the welding current of the welding process that is conducted. Thereby, the reversing of the polarity is carried out under low performance, as the reversing is performed at the defined threshold value. As a consequence, cost-effective hardware may be used.

Another advantage is the alternating between two welding processes with opposite polarities, since because of this the large difference in currents that has to be covered depends on the inductance of the welding current circuit in the short circuit, as the short circuit is maintained during this time. A change of the welding process and the polarity is also carried out in an advantageous way, in a certain short circuit.

In an advantageous manner, the measure of storing the threshold value of the welding current and the duration in dependence of a characteristic curve for the welding process will lead to the values of the parameters being set automatically for the user.

The object of the invention is achieved by an above method for changing a welding process during a welding operation, wherein the change occurs between a short circuit welding process and a pulse welding process and the tip of the welding wire is adapted to the subsequent welding process during a changing phase in dependence of the welding process that is conducted. Thereby, the wire tip will be perfectly prepared (droplet size, temperature conduct and arc length) for the subsequent welding process to guarantee a high process stability. Another advantage is that a droplet is present at the tip of the wire at substantially all times, so the tip of the wire will never cool down. This droplet is formed by a current/time profile dependent on the completed and the subsequent welding process. Accordingly, the current/time profile regulates the heat application as well.

By positioning the welding wire in dependence of the subsequent welding process during the changing phase, the correct arc length for the pulse welding process can be set, and a short circuit for the short circuit welding process can be created.

Another advantage is for the changing phase to be combined with a polarity reversing procedure so that process and polarity may be changed at the same time.

By the measure of forming a droplet, which is detached by the pulse of the pulse welding process immediately following the adaptation, at the tip of the welding wire during the changing phase after reversing the polarity, it is achieved, in an advantageous manner, that the ground current phase of the first cycle occurs in the changing phase, thus enabling a quick change. Having a high process stability right from the outset is advantageous as well.

If at least one parameter is changed from a start value to the end value after a change to the pulse welding process, an adequately aimed adaptation of the pulse parameters in the subsequent pulse welding process can be used to counteract the altered temperature profile of the wire tip in order to re-establish the balanced energy conditions.

This parameter may be, for example, the welding current, the pulse width, the pulse frequency or the wire feeding speed of the pulse welding process.

In the changing phase before the procedure for reversing the polarity, the feeding speed of the welding wire may be changed in order to create a short circuit for the short circuit welding process, and the welding current may be adapted in order to form a droplet, thereby adapting the tip of the welding wire for the short circuit welding process and creating a short circuit so that the polarity can be reversed.

Furthermore, the object of the invention achieves an above method for applying heat prior to a welding operation, wherein prior to starting a welding operation a starting phase is carried out, during which the heat application into the workpiece is regulated by an adjustable number of cycles of at least one welding process. An advantage here is that the material is perfectly pre-heated prior to the welding process since the heat application can be regulated accurately via the number of the cycles and/or the heat application can be adjusted to fit the material precisely. As a consequence, little energy and/or heat is applied into the workpiece over a prolonged period of time.

Cycles of different polarity or different welding processes may be used for this.

When changing between cycles of different welding processes, a method for changing a welding process as specified above is preferably carried out.

Further advantages resulting from this may also be understood from the advantages that have already been described.

The present invention is discussed in more detail by means of the attached schematic drawings, wherein the disclosures contained in the entire description may be referred to like parts with like reference numerals in an analogous manner. Furthermore, single features from the exemplary embodiment(s) shown may also constitute individual solutions according to the invention. In the drawings:

FIG. 2 shows a schematic time course of the welding current and the moving speed of the welding wire in a welding operation comprising a short circuit welding process and a pulse welding process including the changing phases and polarity reversing procedures according to the invention, wherein the pulse width is being changed during the pulse welding process;

FIG. 3 shows a schematic time course of the welding current and the moving speed of the welding wire in a welding operation comprising two short circuit welding processes including the polarity reversing procedures according to the invention;

FIGS. 4a and 4b show schematic time courses of the welding current and the moving speed of the welding wire during the polarity reversing procedure in a detailed view;

FIG. 5 shows a schematic time courses of the welding current and the moving speed of the welding wire in a welding operation comprising a short circuit welding process and a pulse welding process including the changing phases and polarity reversing procedures according to the invention, wherein the amperage of the welding current is being changed during the pulse welding process;

FIG. 6 shows a schematic time course of the welding current and the moving speed of the welding wire in a welding operation comprising a short circuit welding process and a pulse welding process including the changing phases and polarity reversing procedures according to the invention, wherein the pulse frequency is being changed during the pulse welding process;

FIG. 7 shows a schematic time course of the welding current and the moving speed of the welding wire in a welding operation comprising a short circuit welding process and a pulse welding process including the changing phases and polarity reversing procedures according to the invention, wherein the moving speed is being changed during the pulse welding process;

As an introduction it is noted that like reference numerals are used to denote like parts of the exemplary embodiment.

Figure 1:
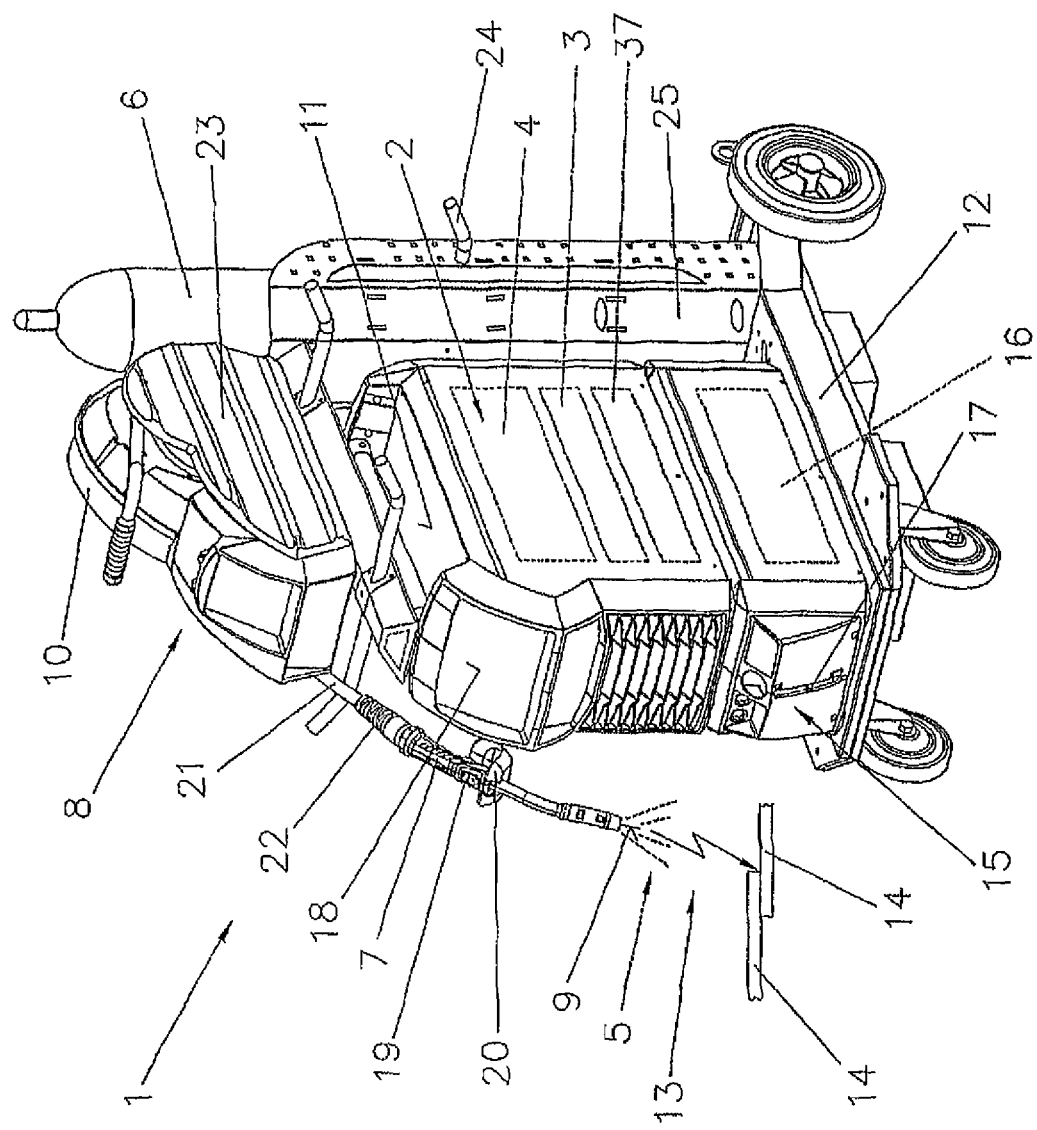
FIG. 1 shows a schematic representation of a welding device.

FIG. 1 shows a welding device 1 and/or a welding installation for many different processes and/or operations such as MIG/MAG welding and/or TIG welding or electrode welding, double-wire/tandem welding operations, plasma operations or brazing and soldering operations etc. The welding device 1 comprises a power source 2 with a power element 3 arranged therein, a control unit 4 and further, not shown components and wires such as a switching member, control valves etc. The control unit 4 may be connected to a control valve that is arranged between a gas storage 6 and a (welding) torch 7 in a supply line for a gas 5, in particular a shielding gas such as $CO_2$, helium or argon and the like.

In addition, the control unit 4 may be used to control also a wire feed unit 8 as it is common for MIG/MAG welding, with an additional material and/or welding wire 9 being supplied to the region of the welding torch 7 from a supply roll 10 and/or a wire coil via a supply line. Of course it is possible for the wire feed unit 8, as it is known from the prior art, to be integrated into the welding device 1, in particular into the housing 11 of the power source 2, in contrast to being an additional device positioned on a cart 12, as illustrated in FIG. 1. This is referred to as a compact welding device 1. Here it is also possible for the wire feed unit 8 to be placed directly on top of the welding device 1, i. e. the housing 11 of the power source 2 is formed on the top surface for receiving the wire feed unit 8 so that the cart 12 can be omitted. It is further possible for the wire feed unit 8 to supply the welding wire 9 and/or the additional material outside of the welding torch 7 to the process site, in which case a non-melting electrode is preferably arranged within the welding torch 7, as is common in TIG welding.

The current for creating an arc 13, in particular a working arc, between the electrode and/or the welding wire 9 and a workpiece 14, which is preferably composed of one or more portions, is supplied from the power element 3 of the power source 2 to the welding torch 7, in particular to the electrode and/or the welding wire 9, via a welding line, not shown, with the workpiece 14 to be welded being connected to the power source 2 via a further welding line for the further potential, not shown, in particular the return lead, so that an electric circuit for a process can be created by means of the arc 13 and/or the plasma beam created. When using a torch with internal arcs 13, both welding lines, not shown, lead to the torch so that an appropriate electric circuit can be established within the torch, as may be the case with plasma torches.

For cooling the welding torch 7, the welding torch 7 may be connected to a liquid tank, in particular a water tank 16 with a level indicator 17, via a cooling device 15 and possible intermediate components such as a flow controller, wherein the cooling device 15, notably a liquid pump used for the liquid positioned within the water tank 16, will be started upon activating the welding torch 7 in order to effect a cooling of the welding torch 7. As is shown in the illustrated exemplary embodiment, the cooling device 15 is positioned on the cart 12 prior to placing the power source 2 thereon. The individual components of the welding installation, i. e. the power source 2, the wire feed unit 8 and the cooling device 15, are formed in such a way that they have respective protrusions and/or recesses so they can be stacked or placed on top of each other safely.

The welding device 1, the power source 2 in particular, further comprises an input and/or output device 18 for setting and/or retrieving and displaying all the various welding parameters, operation modes or welding programmes of the welding device 1. The welding parameters, operation modes or welding programmes that have been set by the input and/or output device 18 are communicated to the control unit 4, which then actuates the individual components of the welding installation and/or the welding device 1 and/or defines corresponding set points for regulating or controlling. Here it is also possible to perform setting procedures via the welding torch 7 when using an appropriate welding torch 7, in which case the welding torch 7 is equipped with a welding torch input and/or output device 18. In this case, the welding torch 7 is preferably connected to the welding device 1, in particular the power source 2 or the wire feed unit 8, via a data bus, in particular a serial data bus. For starting the welding process, the welding torch 7 usually comprises a starting switch, not shown, so the arc 13 can be ignited by actuating the starting switch. In order to protect the user from the great heat radiation of the arc 13, the welding torch 7 may be equipped with a heat protection shield 20.

Moreover, in the exemplary embodiment shown, the welding torch 7 is connected to the welding device 1 and/or the welding installation via a hose pack 21, said hose pack 21 being attached to the welding torch 7 by an anti-buckling means 22. In the hose pack 21, the individual lines such as the supply line and/or lines for the welding wire 9, for the gas 5, for the cooling circuit, for the data transmission etc. are arranged from the welding device 1 to the welding torch 7 while the return lead is preferably connected to the power source 2 separately. The hose pack 21 is connected to the power source 2 or the wire feed unit 8 by a coupling device, not shown, while the individual lines within the hose pack 21 are attached to or within the welding torch 7 by means of an anti-buckling means. In order to guarantee an appropriate strain relief for the hose pack 21, the hose pack 21 may be connected to the housing 11 of the power source 2 or the wire feed unit 8 via a strain relief device, not shown.

In general, it should be noted that for different welding operations and/or welding devices 1, such as TIG devices or MIG/MAG devices or plasma devices, not all components mentioned above have to be used and/or incorporated. It may, for example, be possible for the welding torch 7 to be formed as an air-cooled welding torch 7 so the cooling device 15, for example, might be omitted. As a consequence, it can be said that the welding device 1 is formed by at least the power source 2, the wire feed unit 8 and the cooling device 15, wherein these can also be arranged in a common housing 11. Furthermore, it is possible for further parts and/or components such as a drag protection 23 on the wire feed unit 8 or an optional carrier 24 on a holder 25 for the gas storage 6 etc. to be arranged and/or included. Welding devices 1 designed for an operation called AC welding further comprise an inverter module 37. This enables changing the polarity of the welding current I. The inverter module 37 may be integrated into the housing 11 or may have a housing of its own. If this is the case, the housing of the inverter module is preferably arranged between the cooling device 15 and the housing 11.

Accordingly, such a welding device 1 is designed for carrying out different welding processes. This means that at least two welding processes may be combined during a welding operation, for example in such a way that a welding process with a positive polarity and a welding process with a negative polarity are alternating periodically, with at least one cycle of each welding process being performed. In this case, the change of the welding process is accomplished in a short circuit.

According to the invention it is now provided that the welding wire 9 is targeted into the weld pool, that the tip of the welding wire 9 is adapted during a changing phase 30, that at least one parameter of the pulse welding process 26 is changed from a start value to the end value and/or that a starting phase 31 is carried out prior to the welding process. In this way, the requirement of achieving a low heat application and a high deposition rate for thin metal sheets at the same time can be fulfilled. For this, the change of the welding process is linked to the back-and-forth movement of the welding wire 9.

The invention is described with a common reference to the FIGS. 2 to 9 below.

In order to provide an overview, two process variants are illustrated in FIGS. 2 and 3, applying the invention or at least part of the individual inventions. FIG. 2 illustrates the combination of a pulse welding process 26 or a spray arc welding process and a negative CMT process 27 (short circuit welding process) while FIG. 3 illustrates the combination of a positive CMT process 28 (short circuit welding process) and the negative CMT process 27—i. e. two short circuit welding processes. Basically the pulse welding process 26 and the positive CMT process 28 have positive polarities while the negative CMT process 27 exhibits a negative polarity of the welding current I. In case of a respective polarity change, the polarity of the welding wire 9 is changed. In the process, the positive polarity is responsible for applying heat into the workpiece 14, with an additional cleaning effect of the arc 13 acting on the surface of the workpiece 14. Furthermore, forces known as pinch forces occur, leading to the detachment of the droplet in the pulse welding process 26, for example.

On the contrary, the negative polarity is responsible for the extent of the deposition rate in relation to the heat application. As a consequence, the size of the droplet at the tip of the welding wire 9 can be increased considerably, as substantially no pinch forces which would detach the droplet automatically will occur because of the low density of the flow line.

Hence, according to FIG. 2, the pulse welding process 26 and the negative CMT process 27 are preferably alternating periodically, with a part of the course of the welding current I and the moving speed vd of the welding wire 9 being illustrated. Accordingly, welding processes and polarities are always changing together in the short circuit. In order to accomplish this with a high enough process stability and the required heat application, the change is done by means of a polarity reversing procedure 29 and a changing phase 30. A particular reason for this is that both the welding process—from pulse to short circuit—and the polarity are being changed. In the polarity reversing procedure 29, the welding wire 9 is preferably targeted into the weld pool, whereas in the changing phase 30 the tip of the welding wire 9 is being adapted. If applicable, a parameter of the pulse welding process 26 may be changed from a start value to the end value as well, and a starting phase 31 may be performed prior to the welding process.

According to FIG. 3, the positive CMT process 28 and the negative CMT process 27 are preferably alternating periodically, with a part of the course of the welding current I and the moving speed vd of the welding wire 9 being illustrated. Again, both the welding process and the polarity are changed. Here, however, a changing phase 30 is not required, as the change occurs between two short circuit welding processes with opposite polarities. As above, the welding wire 9 is preferably targeted into the weld pool in the polarity reversing procedure 29 and/or the movement of the welding wire 9 is stopped. If applicable, a starting phase 31 may be performed prior to the welding process here as well.

Basically it can be said that the required settings for FIGS. 2 and 3 are stored in the welding device 1. This means that, if the welder selects a so-called characteristic curve and places a working point on it, the methods according to the invention are performed automatically. Of course the welder can also adjust the number of cycles of each individual welding process to fit the application, so the required heat application can be set in a flexible manner. According to the diagrams as well, the direction of the moving speed vd of the welding wire 9 is changed during a short circuit by moving it backward, i. e. away from the workpiece 14.

The individual parts of the invention will be described in detail below. The individual welding processes will not be discussed in detail as they are known from the prior art.

FIGS. 4a and 4b show how the polarity reversing procedure 29 or the change of polarity is carried out in detail. Up to a point of time t1, a welding process with a positive polarity known from the prior art—such as a positive CMT process 28 or a pulse welding process 26—is performed, with a short circuit being detected between the welding wire 9 and the workpiece 14 at point of time t1. According to the invention, from this point of time t1 on, the welding wire 9 will be moved further for a defined duration 32 (for example in the range of up to approximately 1 ms), so it is submerged deeper into the weld pool. This is done with a moving speed vd in the range from e. g. approximately 20 m/min to 40 m/min, effecting that the tip of the welding wire 9, at which the droplet is attached, is submerged into the weld pool up to a defined length. During this, the material of the workpiece 14 beneath the weld pool is not touched in order to avoid stuttering and guarantee process stability. Accordingly, this duration 32 includes the delay that is caused by the motor of the feeder for the welding wire 9.

Therefore, the horizontal progress within the duration 32 corresponds to the further moving while the drop corresponds to the moving speed vd of the delay. This guarantees that the moving of the welding wire 9 is stopped at point of time t2—i. e. after the duration 32 has ended. However, this also means that the short circuit for the polarity reversing procedure 29 is securely provided. In the polarity reversing procedure 29, the polarity of the welding current I has to change accordingly. As is shown, the polarity is reversed from a positive polarity to a negative polarity such as a negative CMT process 27. The speed of this current change is influenced by the inductance resulting from the variable length of the welding current circuit. Therefore, the duration of the polarity reversing procedure 29 varies. First, between point of time t1 and point of time t3, the welding current T is lowered to a threshold value 33 in the short circuit. Correspondingly, this threshold value 33 (for example in the range from approximately 30 A to 170 A) is defined in such a way that a polarity change can be effected by the hardware of the inverter module 37. Consequently, if the welding current I is above the threshold value 33 at point of time t1, the welding current I must be lowered to the threshold value 33, as can be seen at point of time t3. The duration for this lowering depends on the inductance of the welding current circuit. Substantially, the polarity change at point of time t3 is accomplished by the inverter module 37. After the polarity has been changed, the current I rises to a threshold value 34 in dependence of the inductance of the welding current circuit, between point of time t3 and point of time t4. Accordingly, the moving speed vd of the welding wire 9 according to FIG. 4a remains stopped between point of time t3 and point of time t4 so that the short circuit remains intact. This threshold value 34 (for example in the range of approximately −120 A) is defined in dependence of the characteristic curve in such a way that the tip of the welding wire 9 is appropriately pre-heated and a breaking of the short circuit may be initiated. This depends mainly on the performance area of the subsequent welding process and the material of the workpiece 14. Consequently, the reaching of the threshold value 34 is awaited according to FIG. 4a until the breaking of the short circuit is initiated by a reverse movement of the welding wire 9. Then, the subsequent welding process is started by breaking the short circuit. This means that the breaking of the short circuit must not be initiated prior to the polarity reversing procedure 29—i. e. before the polarity has been changed and/or the current change has been carried out—as is the case at point of time t4. In this way, a short circuit is guaranteed during the polarity reversing procedure 29 from point of time t1 to point of time t4. According to FIG. 4a this is achieved by targeting the welding wire 9 into the weld pool between point of time t1 and point of time t2, and by stopping the moving of the welding wire 9 from point of time t2 to point of time t4. At point of time t4 the breaking of the short circuit is accordingly initiated by moving the welding wire 9 back—i. e. away from the workpiece 14—and igniting a corresponding arc 13 thereafter. As a consequence, the subsequent welding process scheduled after the polarity reversing procedure 29 can be carried out.

According to FIG. 4a, the moving of the welding wire 9 is stopped from point of time t2 to point of time t4. In a similar way this is not required when point of time t2 and point of time t4 coincide according to FIG. 4b. In this case, the moving direction of the welding wire 9 is reversed without stopping it for a longer period of time. It may, however, also be noted that a check is performed at point of time t2 whether the welding current has reached threshold value 33 and threshold value 34 and/or is lower. If this is the case, the moving direction is substantially reversed at point of time t2 (FIG. 4b). If this is not the case, the moving of the welding wire 9 is stopped and the device waits for the threshold values 33 and 34 to be reached (FIG. 4a). This can be summarised by stating that the welding wire 9 is stopped depending on threshold value 34. That is, either until threshold value 34 is reached or the moving direction of the welding wire 9 is reversed.

According to the invention as well as according to FIGS. 4a and 4b, the welding wire 9 is submerged into the weld pool between point of time t1 and point of time t2. As a consequence, the time span between these points of time and the moving speed vd determine how deep the welding wire is submerged. The submersion depth is mainly dependent on the material and the material thickness of the workpiece 14, the required or desired welding bead, the viscosity of the weld pool as well as the polarity and the performance area of the welding process (especially the vibrations of the weld pool depend on this) that has been carried out prior to the polarity reversing procedure 29. In this way, the submersion depth is accordingly synchronised with the characteristic curve and adapted to fit the application. Here, the polarity influences the size of the droplet at the tip of the welding wire 9. During the submersion this droplet is detached because of surface tension, and the short circuit must not break in order to perform an ideal polarity reversing procedure 29. As a consequence, the submersion depth is substantially adapted to the welding process that is conducted prior to the polarity reversing procedure 29.

The polarity reversing procedure 29 may, however, also be included when only the welding process is changed in the short circuit—i. e. the polarity remains the same. In this case, the welding wire 9 is substantially submerged deeper into the weld pool and/or the moving of the welding wire 9 is stopped so that a reliable short circuit is guaranteed when changing the welding process. This may, for example, be used when changing from the pulse welding process 26 to the positive CMT process 28. Of course this polarity reversing procedure 29 may also be performed in the reverse direction.

Referring now to FIGS. 2 and 5 to 7, the changing phase 30 as well as the changing of a parameter of the pulse welding process 26 from a start value to the end value will be described in detail. In this connection the changing phase 30 is substantially used for combining the pulse welding process 26 with a short circuit welding process such as the negative CMT process 27 or the positive CMT process 28. The changing phase 30 is accordingly coupled to the polarity reversing procedure 29 so that in the polarity reversing procedure 29, the welding wire 9 is targeted into the weld pool and/or the moving of the welding wire 9 may be stopped, if applicable, to adjust the tip of the welding wire 9 in the changing phase 30. The description of how to stop the moving of the welding wire 9 and of the submersion of the welding wire 9 into the weld pool is to be found in the description of FIGS. 4a and 4b. The adaptation of the tip of the welding wire 9 is required because both the welding process—between pulse and short circuit—and the polarity are being changed. In particular, the droplet at the tip of the welding wire 9, the heat application and/or the arc length are being adjusted. As the welding process is usually switched periodically, two changing phases 30 are required for performing the required adaptations depending on the welding process that is conducted and the subsequent welding process. This means that, substantially, the changing phases 30 also decouple the pulse welding process 26 from the short circuit welding process. A first changing phase 30a from the short circuit welding process to the pulse welding process 26 is required after the polarity reversing procedure. This first changing phase 30a starts substantially at point of time t4 of the polarity reversing procedure 29, i. e. with an arc 13. A second changing phase 30b from the pulse welding process 26 to the short circuit welding process is required prior to the polarity reversing procedure 29. At the end of the second changing phase 30b, a short circuit is appropriately initiated, with the polarity reversing procedure 29 starting with said short circuit.

This means that, according to FIG. 2, the change from the negative CMT process 27 to the pulse welding process 26 occurs in the first changing phase 30a. In the negative CMT process 27 the arc 13 encloses the wire tip in a very firm way, causing it to heat up greatly. If a change to the pulse welding process 26 in the short circuit would happen now, without changing phase 30, in the beginning much more energy than required were available for a short-circuit-free detachment of the droplet. This would lead to weld spatter being detached together with the droplet. In order to avoid this, the first changing phase 30a follows after the polarity reversing procedure 29. Substantially, it comprises a current pulse forming a droplet from the greatly heated wire tip from the negative CMT process 27. Additionally, in this changing phase 30a the welding wire 9 is retracted and/or positioned out of the weld pool far enough to set the arc length for the pulse welding process 26. For this adaptation the changing phase 30 requires an appropriate duration that is, for example, in the range from approximately 1 ms to 15 ms.

Accordingly, the amperage of the current pulse is adapted to this duration as well so that the droplet formed has the required size. The amperage here is, for example, in a range from approximately 20 A to 170 A, with the cycles of the pulse welding process 26 being repeated at a frequency of up to approximately 500 Hz and the amperage of the pulses being in the range from approximately 200 A to 300 A. The droplet is substantially detached by the pulse of the pulse welding process 26, which follows immediately after the first changing phase 30a. Consequently, the first changing phase 30a substantially replaces the basic current phase of the first cycle of the pulse welding process 26. Should the duration of the first changing phase 30a not be sufficient for adapting the temperature, at least one parameter of the pulse welding process 26 may also be changed from a lower start value to the higher end value if applicable. This means that in the cycles following the changing phase 30 a step-by-step adjustment—starting at a start value—of the pulse widths of the pulses (FIG. 2), the amperages of the pulses and/or the ground current (FIG. 5), the frequencies of the pulses (FIG. 6) and/or a continuous and/or step-by-step adaptation of the moving speed vd (FIG. 7) of the welding wire 9 will be effected until the corresponding end value is reached. According to this, the heat application will be increased incrementally.

In the second changing phase 30b the change from the pulse welding process 26 to the negative CMT process 27 is made. In the pulse welding process 26 a certain amperage of the pulse and pulse width, in particular, is required in order to achieve an optimal droplet detachment via pinch effect depending on the frequencies of the pulses. An important factor for this is, among others, an alignment of the moving speed vd of the welding wire 9, the diameter of the welding wire 9, the shielding gas 5 and/or the arc length. Accordingly, this leads to a certain temperature of the wire tip which is ideal for the pulse welding process 26. Now, if a change to the negative CMT process 27 occurs after a defined number of cycles and/or a step size of the pulse welding process 26, a temperature adapted for this welding process is required. This temperature is appropriately lower than during the pulse welding process 26 and is set in the second changing phase 30b, which takes place prior to the polarity reversing procedure 29. In this second changing phase 30b a droplet, which is detached by a short circuit in the weld pool, is formed together with a current pulse. In order to achieve a short circuit, the moving speed vd of the welding wire 9 is changed accordingly in the second changing phase 30b as well—for example in a range of up to 20 m/min. As shown, this speed may be increased, for example, with the change—i. e. increase or decrease—depending on the performance area of the conducted pulse welding process 26. Therefore, the second changing phase 30b can be ended upon establishment of the short circuit, and the polarity reversing procedure 29 according to FIGS. 4a and 4b can be carried out. Furthermore, the second changing phase 30b requires a certain amount of time to adapt the temperature of the welding wire 9, the moving speed etc. for the negative CMT process 27.

Basically, the welding operation is not interrupted by the polarity reversing procedures 29 and/or the changing phases 30 when changing the welding process, as they are always coupled with a short circuit. As a consequence, a constant heat application with a constantly high deposition rate occurs during the welding operation on average.

Substantially, what has been described applies to the periodical change between the positive CMT process 28 and the pulse welding process 26 as well. The main difference is that after the first changing phase 30a—i. e. during the change from the positive CMT process 28 to the pulse welding process 26—at least one parameter of the pulse welding process is changed from a higher start value to the lower end value. Accordingly the heat application is reduced.

According to the invention, a low heat application and a high deposition rate of the welding wire 9 at the same time are achieved during the welding process. The prerequisite for this is a pre-heating zone for substantially pre-heating the material, such as aluminium and its alloys. This is most important at the start of the welding process, since no welding process has been conducted before and, thus, no heat application into the material and/or the workpiece 14 has taken place. The heat application at the outset of the welding process is mainly dependent on the material and a gap to be bridged so that an adjustable heat application is required. According to the invention, this is solved by regulating the heat application in a starting phase 31 prior to the welding process. For this, the number of cycles can be adjusted in a flexible manner. The cycles here preferably correspond to the cycles of a pulse welding process 26, a negative CMT process 27 and/or a positive CMT process 28, which are combined accordingly during the welding process as well. Therefore, the heat application can be regulated in the starting phase 31 by setting the ratios between positive and negative cycles. Basically, however, the ratios of the cycles are independent from the ratios of the cycles in the welding process. Regarding the regulation of the heat application, a cycle of a positive polarity (positive CMT process 28 and/or pulse welding process 26) applies more heat than a cycle of a negative polarity (negative CMT process 27). As a consequence, the required heating zone is present at the outset of the welding process as well so that an optimal welding process can be conducted.

Figure 8:
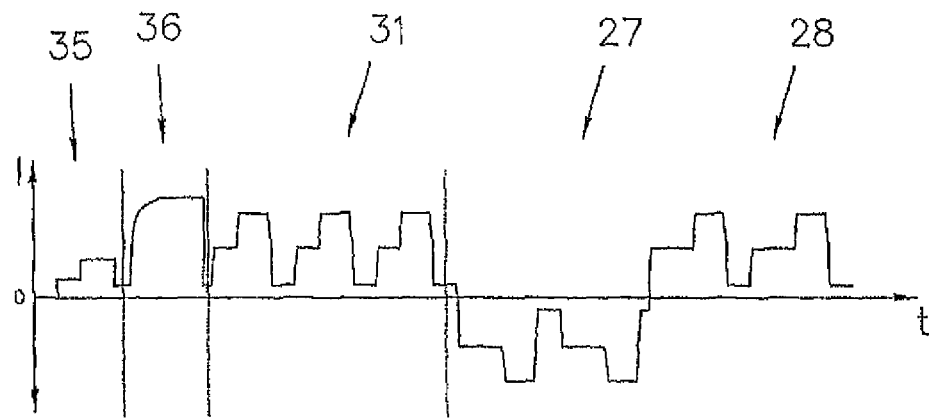
FIG. 8 shows a schematic time course of the welding current of a welding operation including the starting phase according to the invention.
Figure 9:
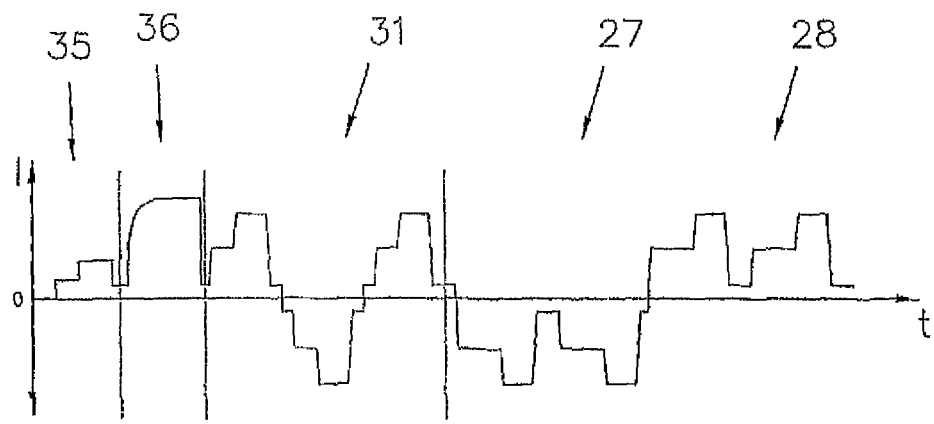
FIG. 9 shows a further schematic time course of the welding current of a welding operation including the starting phase according to the invention.

Examples for the starting phase 31 are illustrated in FIGS. 8 and 9. Here it can be seen that first the arc 13 is ignited in an ignition phase 35, then heat is quickly applied to the workpiece by a spray arc in a phase called hot-start phase 36 while the heat application is adapted to the welding process in the following starting phase 31. Therefore, the heat application will be increased in a controlled manner by the starting phase 31 so that no material of the workpiece 14 melts away and an ideal welding result is achieved. The starting phase 31 may comprise a defined number of positive cycles (FIG. 8) or alternating positive and negative cycles (FIG. 9). Preferably, the starting phase 31 should end with a cycle that has an opposite polarity to the first cycle of the welding process. In this way, a substantially constant heat application is ensured. The definition of the starting phase 31 is set, for example, on the control panel of the welding device 1 by the welder. Likewise the user can select on the control panel whether the hot-start phase 36 is carried out. Accordingly, the hot-start phase 36 is included only if this is required because of the workpiece 14 to be welded. After the defined number of cycles in the starting phase 31 has been carried out, the welding process is conducted in a corresponding manner.

For performing a welding operation, the user preferably selects a characteristic curve in which the methods according to the invention are stored. Correspondingly, all parameters of the characteristic curve are adapted to fit the application and its performance area. Of course, however, it is also possible for the user to set the methods according to the invention manually or to change the associated stored parameters. In a similar manner it is possible for the user to set a number of cycles. For example, ten cycles may be used for the starting phase 31, and sixty cycles for the welding processes. According to the application, the appropriate welding processes are selected automatically so that the required heat application and deposition rate, in particular, are achieved.

The invention claimed is:

1. A method for changing a welding process during a welding operation, wherein the change is carried out from a welding process that was conducted to a subsequent welding process during a short circuit between a melting welding wire and a workpiece, wherein the welding process and the subsequent welding process have opposite polarities and the polarities are changed in a polarity reversing procedure, wherein upon detecting the short circuit of the welding process that is conducted, the welding wire is still moved for a defined duration in the movement direction and subsequently stopped, depending on a first threshold value of the welding current of the subsequent welding process, whereupon the welding wire is moved in the opposite direction in order to start the subsequent welding process upon reaching the first threshold value of the welding current, wherein when the welding process has a negative polarity, a changing phase is inserted after the polarity reversing procedure and when the welding process has a positive polarity, the changing phase is inserted before the welding reversing procedure.

2. The method according to claim 1, wherein the change is carried out upon reaching a second threshold value of the welding current of the welding process that is conducted.

3. The method according to claim 1, wherein the first threshold value of the welding current and the duration are stored for the welding process depending on a characteristic curve.

4. A method for changing a welding process during a welding operation, wherein the change is carried out from a welding process that was conducted to a subsequent welding process during a short circuit between a melting welding wire and a workpiece, wherein the change is made between a short circuit welding process and a pulse welding process, wherein the welding wire is targeted into a weld pool and wherein the tip of the welding wire is adapted for the subsequent welding process, depending on the welding process that was conducted, in a changing phase, wherein the changing phase is combined with a polarity reversing procedure, wherein when the welding process has a negative polarity, a changing phase is inserted after the polarity reversing procedure and when the welding process has a positive polarity, the changing phase is inserted before the welding reversing procedure.

5. The method according to claim 4, wherein in the changing phase the welding wire is positioned depending on the subsequent welding process.

6. The method according to claim 4, wherein after the polarity reversing procedure in the changing phase a droplet is formed at the tip of the welding wire, which is detached by the pulse of the pulse welding process immediately following an adaptation of the tip of the welding wire.

7. The method according to claim 4, wherein after a change to the pulse welding process at least one parameter of the pulse welding process is changed from a start value to an end value.

8. The method according to claim 7, wherein a welding current is changed incrementally per pulse as a parameter of the pulse welding process.

9. The method according to claim 7, wherein a pulse width is changed incrementally per pulse as a parameter of the pulse welding process.

10. The method according to claim 7, wherein a pulse frequency is changed incrementally per pulse as a parameter of the pulse welding process.

11. The method according to claim 7, wherein a wire moving speed of the pulse welding process is changed continuously per pulse at least in a range.

12. The method according to claim 4, wherein in the changing phase prior to the polarity reversing procedure the feeding speed of the welding wire is changed in order to create a short circuit for the short circuit welding process and the welding current is adapted to form a droplet.

13. A method for applying heat prior to a welding operation, wherein prior to the start of the welding operation a starting phase is carried out, in which the heat application into the workplace is regulated by an adjustable number of cycles of at least one welding process, the starting phase occurring after an ignition phase, wherein cycles of different polarities are being used and the polarities are changed in a polarity reversing procedure wherein when the cycles are changed from a negative polarity to a positive polarity, a changing phase is inserted after the polarity reversing procedure and when the cycles are changed from a positive polarity to a negative polarity, the changing phase is inserted before the welding reversing procedure.

14. The method according to claim 13, wherein cycles of different welding processes are being used.

15. The method according to claim 13, wherein when changing between cycles of different welding processes a method according to claim 1 is being carried out.

* * * * *